United States Patent
Ciudad et al.

(10) Patent No.: US 8,294,823 B2
(45) Date of Patent: Oct. 23, 2012

(54) VIDEO COMMUNICATION SYSTEMS AND METHODS

(75) Inventors: Jean-Pierre Ciudad, San Francisco, CA (US); Michael Stochosky, San Francisco, CA (US); Kurt Knight, Menlo Park, CA (US); Scott Forstall, Mountain View, CA (US); Ralph Brunner, Cupertino, CA (US); Chendi Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 575 days.

(21) Appl. No.: 11/462,608

(22) Filed: Aug. 4, 2006

(65) Prior Publication Data

US 2008/0030621 A1 Feb. 7, 2008

(51) Int. Cl.
*H04N 9/74* (2006.01)
*H04N 7/14* (2006.01)

(52) U.S. Cl. .................................... 348/586; 348/14.08

(58) Field of Classification Search ............... 348/14.01, 348/14.1, 14.08, 14.09, 220.1, 239, 586; 382/100, 154

See application file for complete search history.

(56) References Cited

U.S. PATENT DOCUMENTS

| | | | |
|---|---|---|---|
| 5,854,893 A | 12/1998 | Ludwig et al. | |
| 6,237,025 B1 | 5/2001 | Ludwig et al. | |
| 6,351,762 B1 | 2/2002 | Ludwig et al. | |
| 6,583,806 B2 | 6/2003 | Ludwig et al. | |
| 6,593,955 B1 | 7/2003 | Falcon | |
| 6,594,688 B2 | 7/2003 | Ludwig et al. | |
| 6,621,524 B1 * | 9/2003 | Iijima et al. | 348/584 |
| 7,152,093 B2 | 12/2006 | Ludwig et al. | |
| 7,206,809 B2 | 4/2007 | Ludwig et al. | |
| 7,227,567 B1 * | 6/2007 | Beck et al. | 348/14.07 |
| 7,421,470 B2 | 9/2008 | Ludwig et al. | |
| 7,433,921 B2 | 10/2008 | Ludwig et al. | |
| 2005/0140802 A1 * | 6/2005 | Nam | 348/239 |
| 2005/0204287 A1 * | 9/2005 | Wang | 715/716 |
| 2007/0103483 A1 * | 5/2007 | Glen | 345/592 |

OTHER PUBLICATIONS

"iChat AV Beta." iChat AV Beta: Reviews—Software—Internet—ZDNet Australia [online]. Jul. 21, 2003 [retrieved on Jan. 7, 2009]. Retrieved from Internet electronic mail: <http://www.zdnet.com.au/reviews/software/internet/soa/iChat-AV-Beta/0,139023437,12027...>.

* cited by examiner

*Primary Examiner* — Chieh M Fan
*Assistant Examiner* — Akshay Trehan
(74) *Attorney, Agent, or Firm* — Schwegman Lundberg & Woessner, P.A.

(57) ABSTRACT

An image of a background is stored and thereafter removed from a video stream. Substitute background video data is merged into the video stream and provided to videoconference participants.

16 Claims, 7 Drawing Sheets

VIDEO COMMUNICATION SYSTEMS AND METHODS

CROSS-REFERENCE TO RELATED APPLICATION

This application is related to co-pending U.S. Patent Application No. 60/821,509, entitled VIDEO COMMUNICATION FILTERING SYSTEMS AND METHODS, filed on Aug. 4, 2006, and subsequently converted to utility application Ser. No. 11/537,217, now issued as U.S. Pat. No. 7,889,434.

BACKGROUND

This patent document relates to conferencing systems and methods.

Videoconferencing systems facilitate both audio and video communication among participants over a network. A conventional video conferencing system includes a near end and far end components. In a conventional videoconferencing system, image data associated with a near end user and the near end user's background is captured by a near end video camera or other capture device. The near end captured image data is transmitted to a far end receiver and displayed to a far end user. Similarly, the near end image data can be displayed on a local system (e.g., displayed on a near end display component) along with far end image data that has been captured by the far end system components.

SUMMARY

Disclosed herein are systems and methods for removing a background from a video stream of a videoconference participant environment and for optionally adding substitute background video data into the video stream and providing the video stream to videoconference participants.

In a videoconferencing example, an image of a background is stored. Thereafter, video of the background and the participant is received, and the image of the background is subtracted from the video frames. Substitute background video can be merged into the video frames and the merged video frames can be transmitted to a videoconference.

In a videoconferencing device example, a system includes a video camera, a data store, a communication subsystem, and a video processing device. The system is configured to transmit and receive videoconferencing data over a network, such as a local area network or the Internet. The videoconference data can include both still image data and streaming video data. The video camera is configured to generate video data, and the data store stores background data files. The video processing device is configured to capture camera background data of a videoconference environment and receive video data of the video conference environment and remove the camera background data from the video data and substitute the background data files to generate composite video data. The video processing device communicates with the communication subsystem to transmit the composite video data to a videoconference.

These and other implementations are described in detail below.

DETAILED DESCRIPTION

Figure 1:
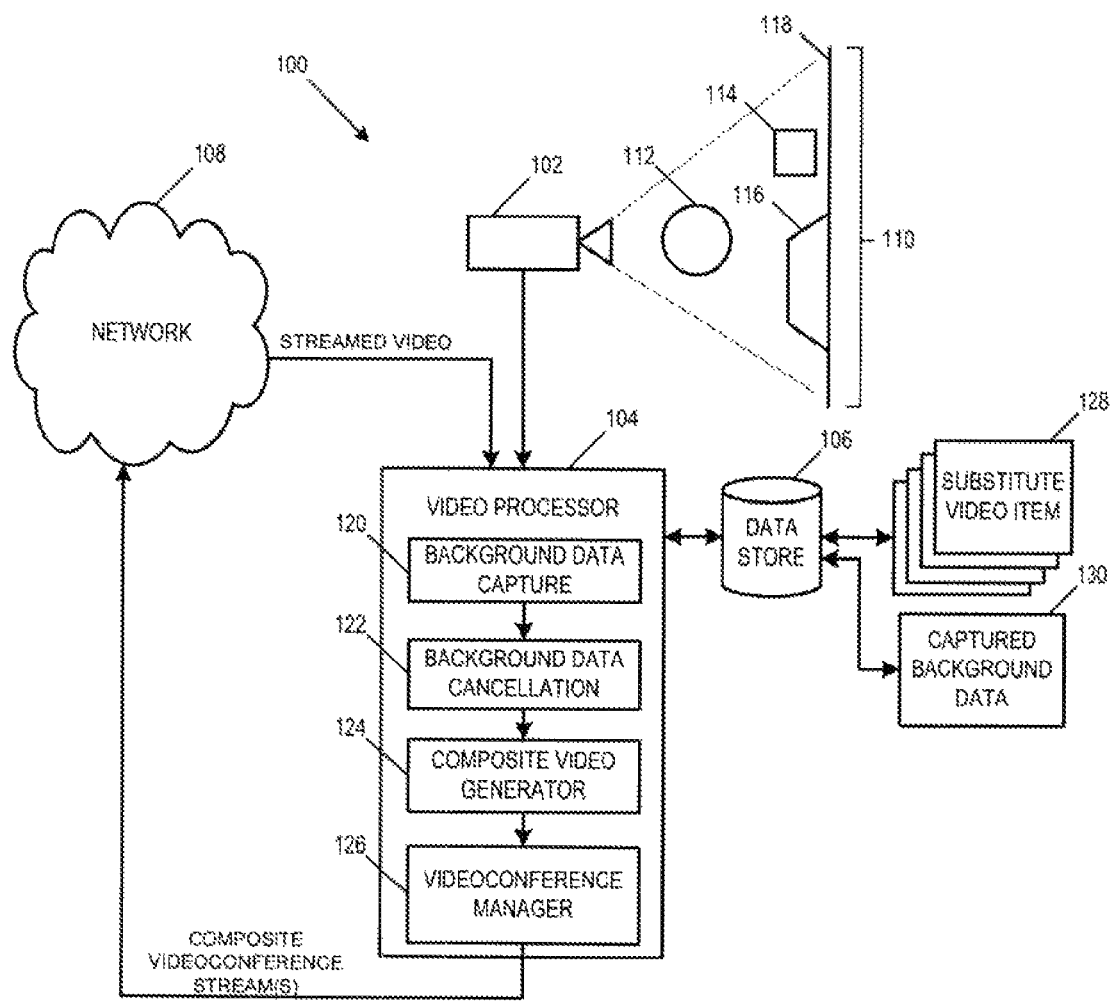
FIG. 1 is a block diagram of a system for substituting background video into a video conference.

FIG. 1 is a block diagram of a system 100 for substituting background video into a video conference. In one implementation, the system 100 can be used to store reference video data of an environment, such as a background image, receive video data of the environment, and subtract the stored reference video data from the received video data to remove the reference video data, such as the background. The video data with the background removed can then be transmitted to other videoconference participants. In another implementation, the system 100 can add background video data to the subtracted video data to generate composite video data, and transmit the composite video data to other videoconference participants. The system includes a video capture device 102, a video processor 104 and a data store 106. The system can be connected to a network 108 over which a videoconference may be conducted.

The video capture device 102 (e.g., digital camera) can capture still images and/or live video and generate a video input stream of the still image or live video. In one implementation, the video data is captured at a rate of substantially thirty frames per second. Other implementations can capture the video data at difference frame rates, as specified by the properties of the capture device, or as determined by the configuration of the system 100. The video capture device 102 can be wired or wireless, and can be integrated into a computer, game system, portable game system, portable media player, cellular telephone, portable music player (e.g., an iPod®, available from Apple Computer, Inc., Cupertino, Calif.), or other suitable device. In one implementation, the video capture device 102 is an Apple iSight Video Camera®, available from Apple Computer, Inc.

In one implementation, the video capture device 102 can capture the contents of a participant environment 110 in which a participant 112 participates in a videoconference. For example, the environment 110 may be an office in which the participant 112 works, and can include that which is within view of the video capture device 112. Thus, the participant environment 110 may include a box 114, a bookshelf 116, and a section of a wall 118. During the videoconference, video of the participant 112 and the participant environment 110 are captured to generate video data, such as video stream.

In one implementation, the system 100 can remove the participant environment 110 from the video data, and thus generate subtracted video data that includes only the participant 112. In another implementation, the system 100 can add background video data, such as a still image (e.g., a sunset) or a video that is either stored or received (e.g., a movie clip, a news feed, a stock ticker, etc.).

A video processor 104 can be used to receive streamed video from the network 108, remove the captured background image, and send one or more composite videoconference streams to participants of the videoconference. The video processor can also communicate with a data store 106 to facilitate the storing and retrieving of data (e.g., images and video streams). In this example implementation, the video processor 104 includes a background data capture engine 120, a background data cancellation engine 122, a composite video generator engine 124, and a videoconference manager 126.

The background data capture engine 120 can capture the background data of the environment 110. In one implementation, the system 100 instructs the participant 112 to move out of the view of the video capture device 102, and the video capture device 102 records an image of the background to be stored as reference data. In this example implementation, the video capture device 102 locks the exposure setting and the light balance. The captured background data can be used by the other engines of the video processor 104, and may be stored in the data store 106.

The background data cancellation engine 122 can receive the captured background data from the background data capture engine 120 and additional video data (e.g., the video stream generated by the video capture device 102 after the participant 112 moves back into the view of the video capture device). The background data cancellation engine 122 can subtract the captured background data from the additional video data. In one implementation, subtraction is computed by determining if a pixel of the captured background data matches a pixel of the additional video data. In one implementation, if the pixels match, the pixel in the captured data is designated as transparent. Pixels may be determined to match if their respective data values are within a threshold range. In one implementation, background data cancellation is processed for each video frame.

The composite video generator engine 124 can receive the subtracted video data (i.e., the video stream having the captured background data removed) and add substitute background video data. In one implementation, layers are combined to form a composite. For example, a first layer may include a video of the participant 112, the pixels of which do not match the captured background data and thus are not transparent, and the video of the background, the pixels of which do match the captured background layer and thus are transparent. A second layer may include substitute background data and the second layer is subordinate to the first layer. Accordingly, the second layer is shown only through the transparent pixels of the first layer when the first layer is merged with the second layer.

The videoconference manager 126 can receive the merged or composite video data from the composite video generator engine 124 and transmit the data over the network 108 to one or more participants of a videoconference. In one implementation, the videoconference manager engine includes a user interface which can display outgoing and incoming video streams and facilitate user input and control.

The data store 106 communicates with the video processing subsystem 104 and can store and retrieve substitute video items 128 and the captured background data 130. The substitute video items 128 may include video data, image data, slideshow data, or other data. The substitute image items 128 may be stored in files or may be streamed data items. For example, the participant can download video data from the network 108 for use as the substitute video item 128. Alternatively, the video processor 104 may utilize streamed video data received over the network 108 as substitute video data.

Image data may include still images, or video data that is constant for each frame of video. Slideshow data can include a plurality of substitute video items 128, such as image files, video files, and streaming sources for streamed video data, for example. Each substitute video item 128 may be abstracted as a "slide," and the slides may be periodically selected from the slideshow data for substitution into the background to generate the composite video data.

The videoconference manager 126 can transmit the composite video stream over the network 108 to other participants connected to the videoconference. In one implementation, the composite video stream is transmitted to all videoconference participants. In another implementation, user selections for one or more substitute video items 128 and one or more videoconference participants are received to associate composite video streams with selected videoconference participants. The selected composite video streams are then transmitted to the respectively associated videoconference participants.

Videoconference participants communicate over the network 108. The network 108 may include a local area network (LAN), a wide area network (WAN), or other wired and wireless networks.

Figure 2:
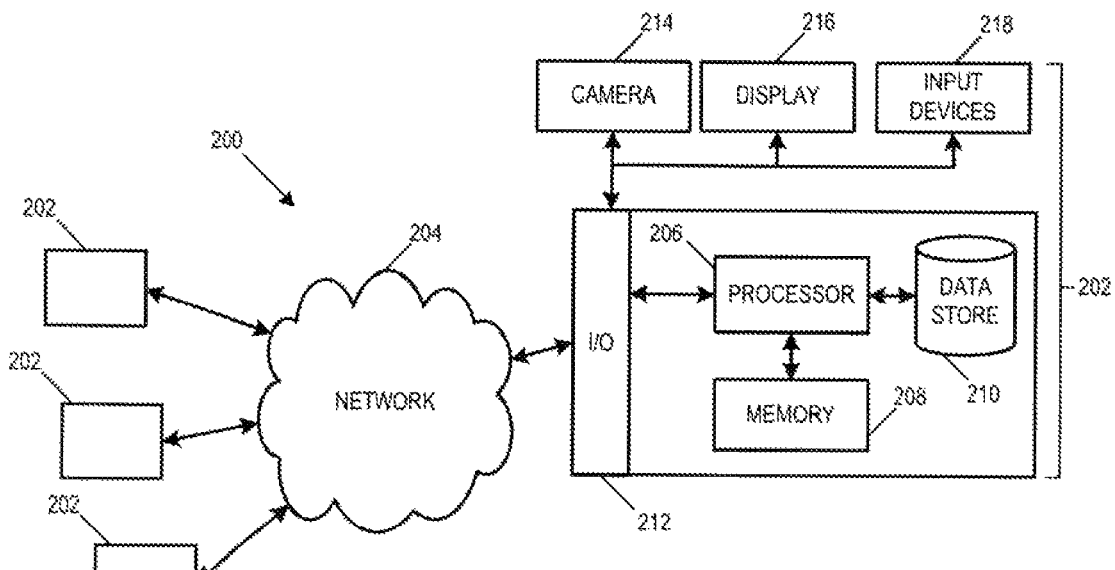
FIG. 2 is an example network environment in which the system of FIG. 1 may be implemented.

FIG. 2 is an example network environment 200 in which the system 100 of FIG. 1 may be implemented. The example network environment 200 includes one or more computing systems 202 connected to a network 204. Example networks 204 include LANs, WANs, and other wired and wireless networks. Each computing system 202 includes one or more processors 206, memory 208, a data store 210, and an I/O system 212. The I/O system 212 can be connected to a camera 214, a display 216, and input devices 218. By implementing the systems 100 in the computing systems 202, videoconference participants may send and receive both modified and unmodified video data over the network 204. Example computing systems 202 can be wired or wireless devices, and can be integrated into a computer, a portable media player, cellular telephone, a portable music player or other suitable device configured to provide videoconferencing functionality.

The processors 206 process incoming software and hardware requests and communicate with the memory 208, the data store 210, and the I/O system 212. Example processors include Complex Instruction Set Computers (CISC) and Reduced Instruction Set Computers (RISC), and the like. The processors 206 may also include Graphical Processing Units (GPUs) to facilitate the processing of image data and video data.

The memory 208 can provide storage for the processors 206 and can be used to facilitate the execution of instructions generated by software or hardware on the computing system 202. For example, the memory can be used to store a reference to an image file, which can be used by the system 100 to modify the background image for each frame of the video data.

The data store 210 can provide storage for the one or more processors 206 and can be used to store and retrieve information. For example, that data store 210 can store and retrieve previously stored data (e.g., video or images) from the videoconference or from other data sources. Example data stores 210 include hard drives, flash memory devices, dynamic random access memory devices, and the like.

The I/O system 212 facilitates communication between the network 204 and the computing system 202. The I/O system 212 can also facilitate communication between the processors 206 and other hardware devices attached to the computing system 202, such as the camera 214, display 216, and input devices 218.

The camera 214 can capture video and image data for use in a videoconference. The camera can also capture audio from the videoconference, and can receive commands from the computing system 202. For example, the camera can receive commands that can modify the zoom of the camera, start and stop the camera recording, or take a snapshot of the background of a videoconference environment 110.

The display 216 can be a cathode ray tube (CRT) device, liquid crystal display (LCD) device, and the like. The display 216 may also be touch sensitive to facilitate touch inputs, such as touch inputs generated by a stylus or a user's finger.

One or more input devices 218 can be used by the computing system 202 to enter commands. For example, the input devices 218 can be used to generate controls to select a new background image or video, to generate commands for the videoconference manager 126, or mute the sound on the capture device 102. Example input devices 218 include a keyboard, a mouse, a stylus, and the like.

Figure 3:
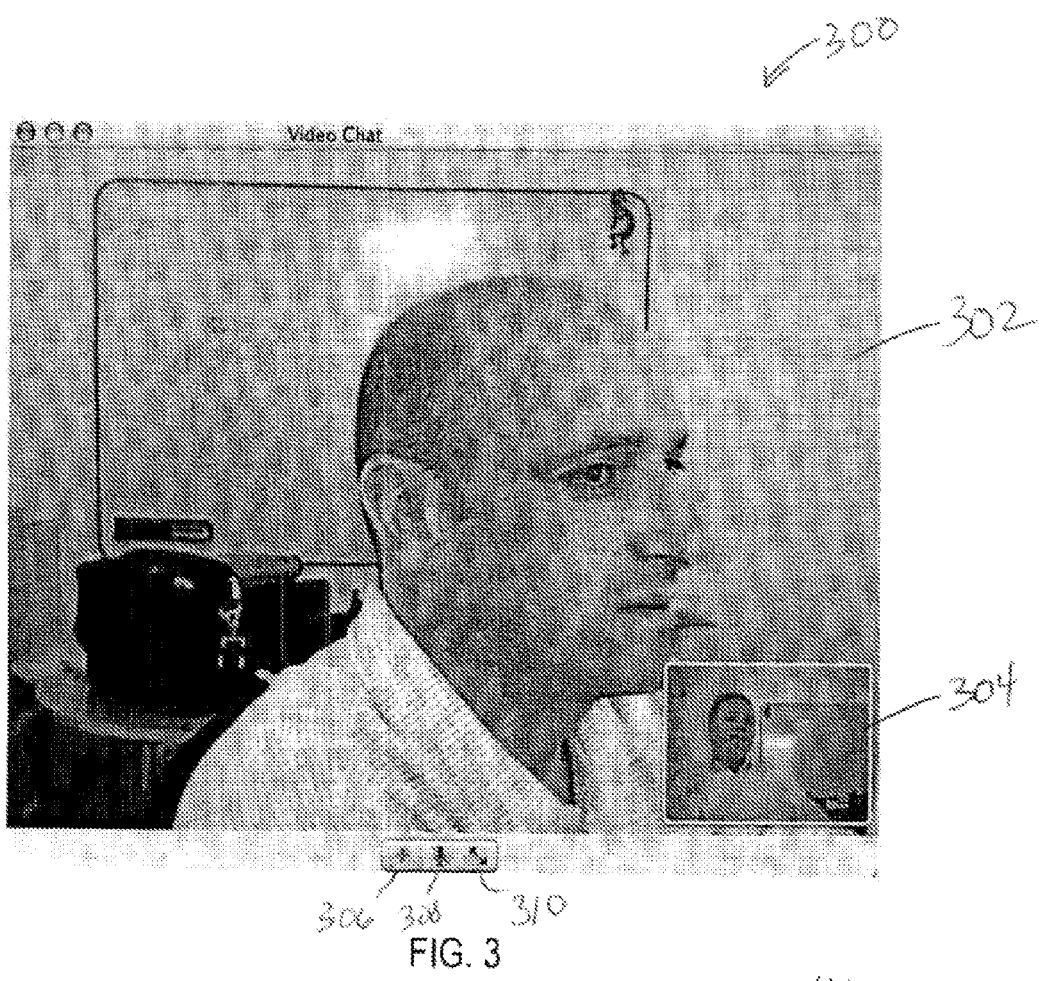
FIG. 3 is a video communication environment.

FIG. 3 is a video communication environment 300. The example video communication environment 300 illustrates a videoconference with two participants. The video communication environment 300 can be displayed by the display 216 and managed by the videoconference manger 126. In one implementation, the environment 300 is subdivided into subsections. The received video is displayed in subsection 302, which shows the first participant, while the outgoing video is displayed in subsection 304, which shows the second participant. The example environment can be shown on the display 216 of the second participant, and thus subsection 304 is subordinate to subsection 302, as the second participant is conferencing with the first participant shown in subsection 302. In this implementation, subordinate subsections are displayed in a picture-in-picture representation. The environment 300 also includes interfaces (e.g., user interface buttons), such as an add participant button 306, audio mute button 308, and full screen button 310.

Figure 4:
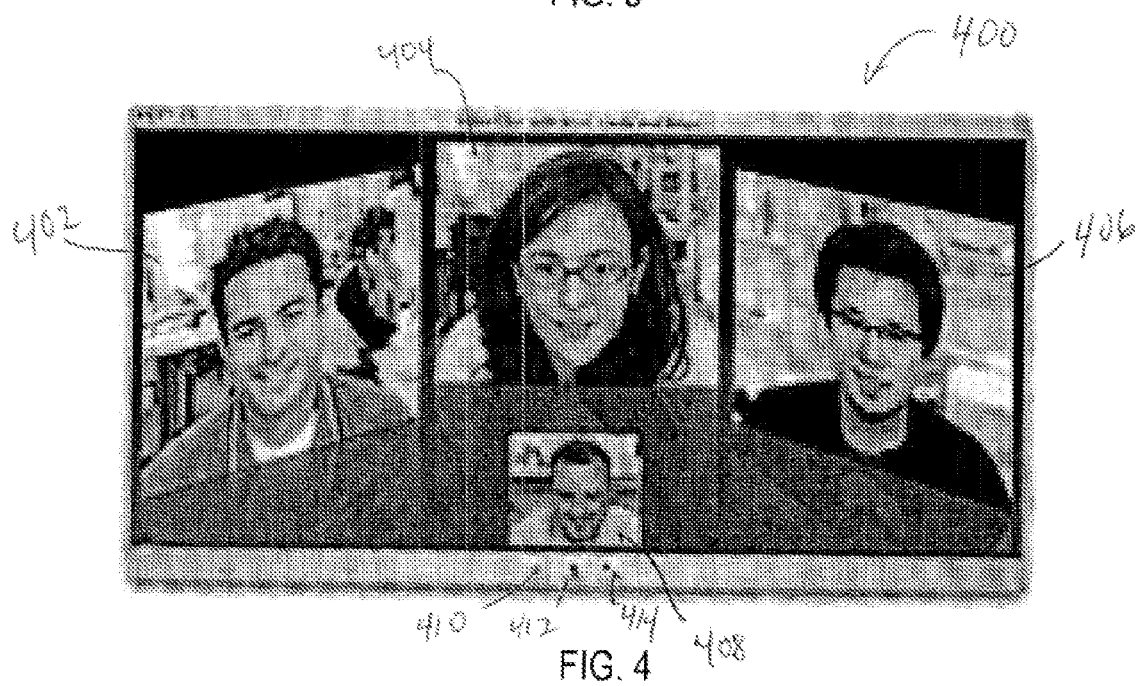
FIG. 4 is another video communication environment.

FIG. 4 is another video communication environment 400. The example video communication environment 400 illustrates a videoconference with more than two participants. The video communication environment 400 can be displayed by the display 216 and managed by the videoconference manager 126. The received video streams are displayed in subsections 402, 404 and 406. The outgoing video is displayed in subsection 408, which is subordinate to subsections 402, 404 and 406. In this implementation, the subordinate subsection 408 is displayed in a smaller subsection that is juxtaposed to the subsections 402, 404 and 406. The environment 400 also includes interface buttons, such as an add participant button 410, audio mute button 412, and full screen button 414.

The participants can select different backgrounds for different outgoing video streams. For example, in FIG. 4, the participant displayed in subsection 408 can send the background image of a bus to the participant in subsection 402, and send video data as the background to the participant in subsection 404, and send an original (e.g., unmodified) background image to the participant shown in subsection 406. Alternately, the participant displayed in subsection 408 can send the same composite video stream to all participants displayed in subsections 402, 404, and 406.

Figure 5:
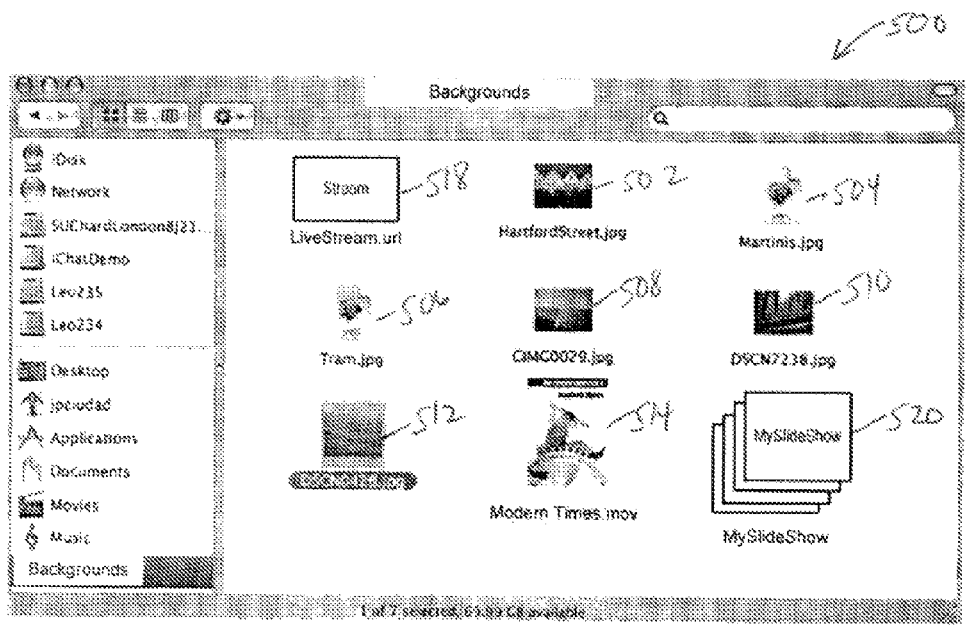
FIG. 5 is an example data store environment for storing background video data items.

FIG. 5 is an example data store 500 environment for storing background video data items, such as data items 128. A participant may select one or more of the background data items as substitute background data in one or more composite video streams. The substitute background video data items can be stored locally, or remotely, and can exist as a file or as a link to a data source. For example, the background data items may include image files, such as the image files 502, 504, 506, 508, 510, and 512; video files, such as the video file 514; a link to a video file, stream or image, such as the stream link 516; and a slide show file, such as the slideshow file 518; or other data. The slideshow file 518 can define a slideshow that includes one or more of the files 502, 504, 506, 508, 510, 512, 514, and 516.

Figure 6:
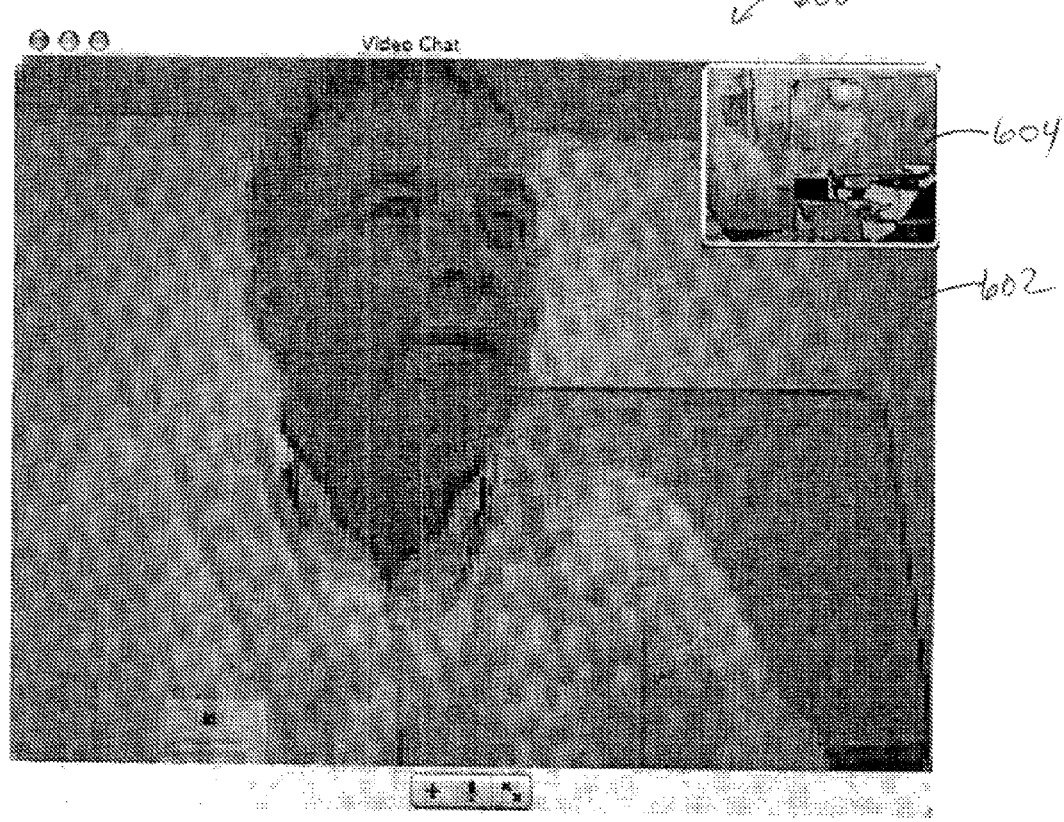
FIG. 6 is a video communication environment during which a video processing device is capturing background video data.

FIG. 6 is a video communication environment 600 during which a video processing device is capturing background video data. This example communication environment 600 is a screenshot from a videoconferencing device of a sending participant that is in the process of capturing a background image of the sending participant's videoconference environment. The video stream received by the sending participant's device is shown in subsection 602. The sending participant, shown in subordinate subsection 604, is in the process of moving out of the view of a video capture device 102, such as video camera. In one implementation, the sending participant can choose when the system 100 captures the background data. For example, after the sending participant moves completely out of view, the sending participant can hit the space bar of a keyboard to cause the system 100 to capture the background data. In another implementation, the system 100 may present a countdown, e.g., 10 seconds, the end of which causes the system 100 to capture the background data.

Figure 7:
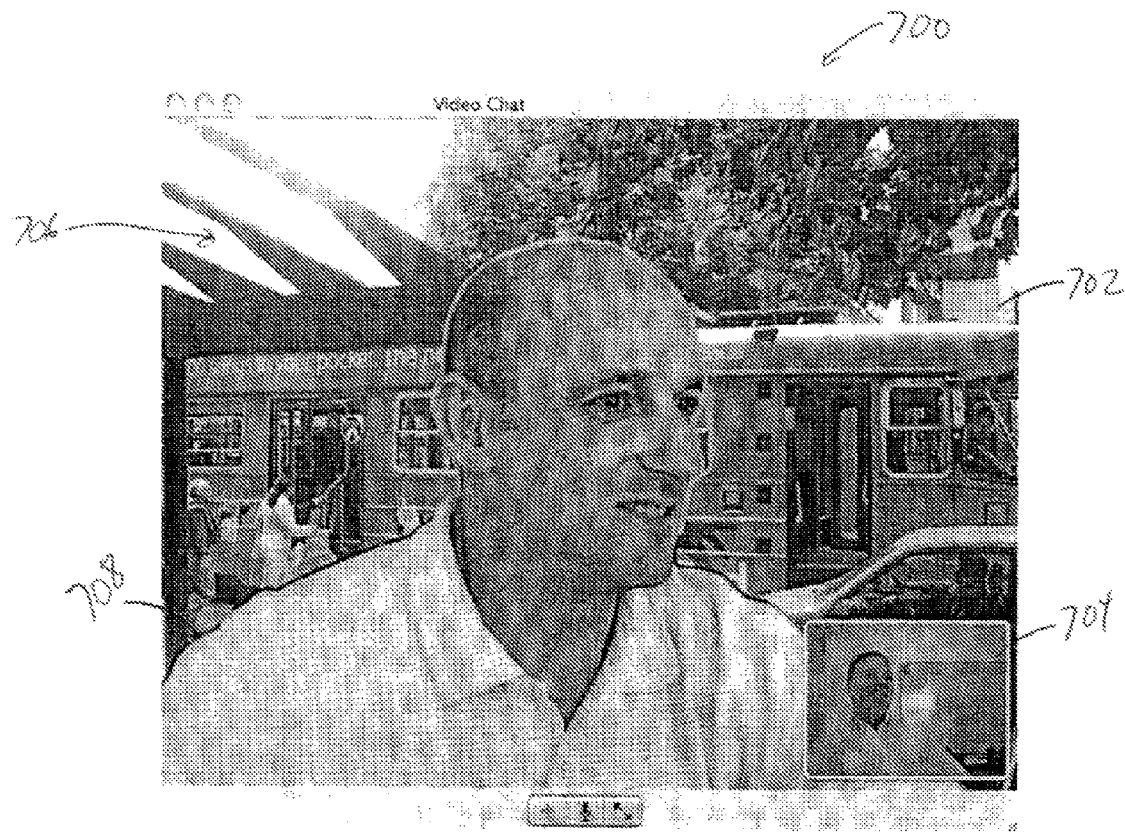
FIG. 7 is an example video communication environment for a videoconference participant that is receiving composite video data having a substituted background.

FIG. 7 is an example video communication environment 700 for a videoconference receiving participant that is receiving composite video data having a substituted background. This example communication environment 700 is a screenshot from the videoconferencing device of the receiving participant. Subsection 702 shows a frame of the composite video sent from the sending participant's videoconferencing device and received by the receiving participant's videoconferencing device. The sending participant 708 is shown in the subsection 702, and the receiving participant is shown in subsection 704. A substituted background 706 can be a video playback, an image, a live video feed, one of several items in a slideshow, or other data.

Figure 8:
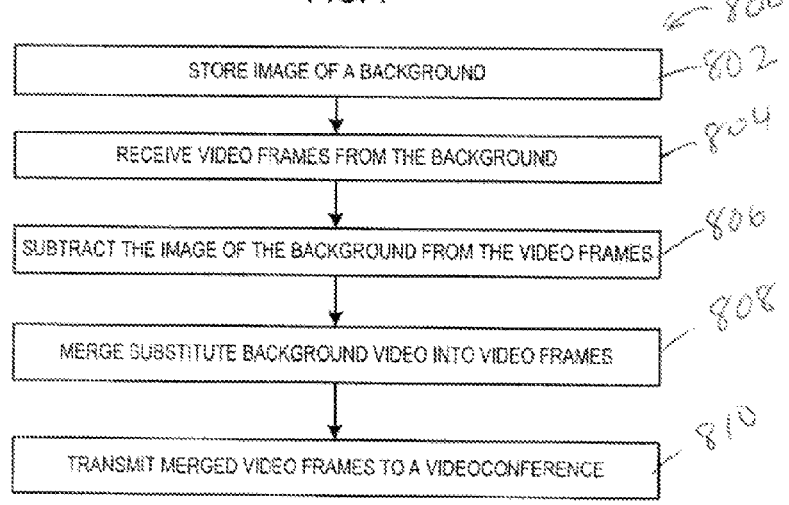
FIG. 8 is a flow diagram of an example process of generating and transmitting composite video having a substitute background in a videoconference.

FIG. 8 is a flow diagram of an example process 800 of generating and transmitting composite video having a substitute background in a videoconference. Stage 802 stores an image of a background. For example, the background data capture engine 120 may capture an image of the participant environment 110 and store the image in the data store 106.

Stage 804 receives the video frames from the background. For example, after capturing a background image, the video processor 104 may resume receiving video of the participant environment 110. This video may also include the participant 112, who may move back into view of the video capture device 102 after the background data is captured.

Stage 806 subtracts the image of the background from the video frames. In one implementation, the subtraction is performed by a background data cancellation engine 122. For example, the subtraction can determine transparency values for pixels in the background frames.

Stage 808 merges substitute background video into video frames. For example, pixels in the background frames can be replaced with corresponding pixels in the substitute background frames by the composite video generated 124.

Stage 810 transmits merged video frames to a videoconference. For example, the videoconference manager 126 may transmit the merged frames to other video conference participants over the network 108.

Figure 9:
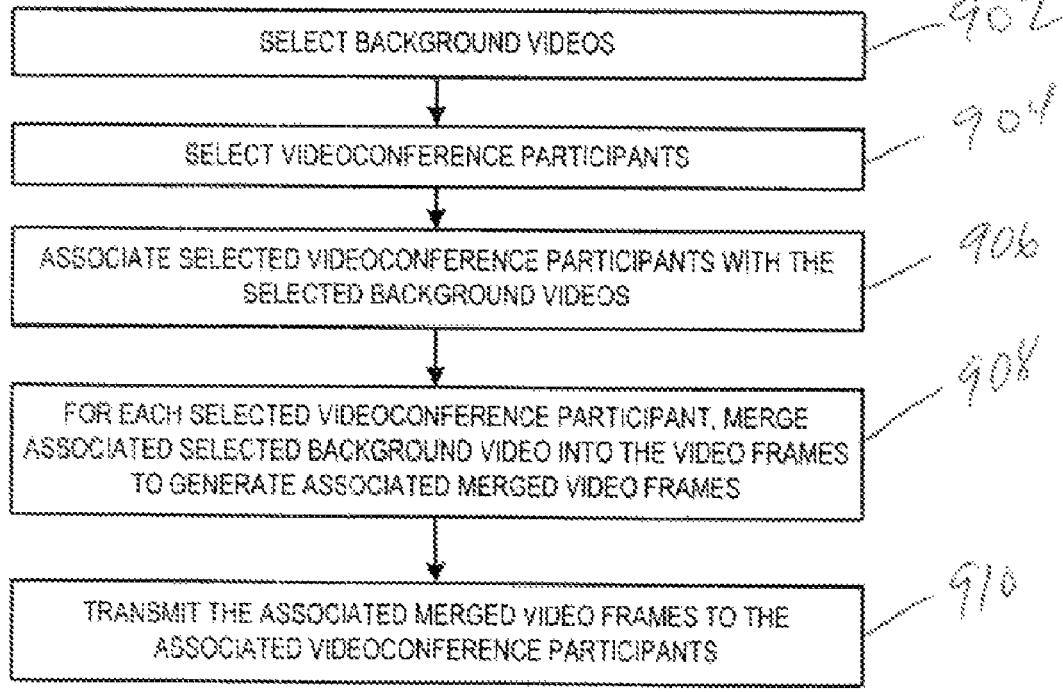
FIG. 9 is a flow diagram of an example process of generating and transmitting associated composite video to selected videoconference participants.

FIG. 9 is a flow diagram of an example process 900 of generating and transmitting associated composite video to selected videoconference participants. Stage 902 selects the background videos. For example, the participant can be prompted to select the background videos by the videoconference manager 126. The background videos can include image data, video data, or streamed data.

Stage 904 selects the videoconference participants. In one implementation, the sending participant can click another incoming participant's video displayed on the display 216, such as in the video conference environment 400. The videoconference manager 126 interprets the click as a selection.

Stage 906 associates selected videoconference participants with the selected background videos. For example, the videoconference manager 126 can associate the selected background videos selected in stage 902 with the selected videoconference participant(s) selected in stage 904 into an association.

Stage 908 merges the associated selected background video into the video frames to generate associated merged video frames for each selected video conference participant.

Stage 910 transmits the associated merged video frames to the associated videoconference participants. In one implementation, the participants that have not been associated with substituted background videos in stage 906 receive an unmodified version of the video stream, i.e., the video stream includes the participant 112 and the videoconference environment 110. In another implementation, the participants that have not been associated with substituted background videos in stage 906 receive only video data related to the participant 112, e.g., the video stream may show only the participant 112 and a blank background.

Figure 10:
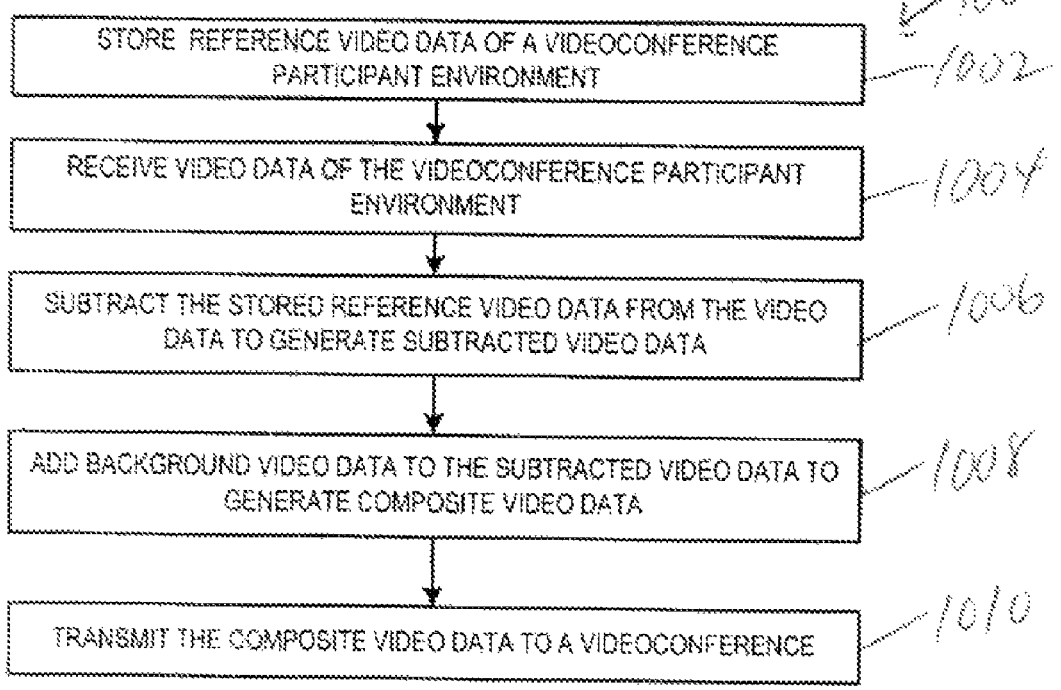
FIG. 10 is a flow diagram of another example process of generating and transmitting composite video having a substitute background in a videoconference.

FIG. 10 is a flow diagram of another example process 1000 of generating and transmitting composite video having a substitute background in a videoconference. Stage 1002 stores reference data of a videoconference participant environment. For example, the background data capture engine 120 may capture an image of the participant environment 110 and store the image as reference data in the data store 106.

Stage 1004 receives the video data of the videoconference participant environment. For example, after capturing the reference data, the video processor 104 may resume receiving video of the participant environment 110. This video may also include the participant 112, who may move back into view of the video capture device 102 after the background data is captured.

Stage 1006 subtracts the stored reference data from the video data to generate subtracted video data. In one implementation, the subtraction is performed by the background data cancellation engine 122. For example, the subtraction can cause the matching pixels to be set to a default color, such as blue or green.

Stage 1008 adds the background video data to the subtracted video data to generate composite video data. For example, pixels in the background frames that are the default color can be replaced with corresponding pixels in the substitute background frames by the composite video generated 124.

Stage 1010 transmits the composite video data to a video conference. For example, the videoconference manager 126 may transmit the composite video data to other video conference participants over the network 108.

Figure 11:
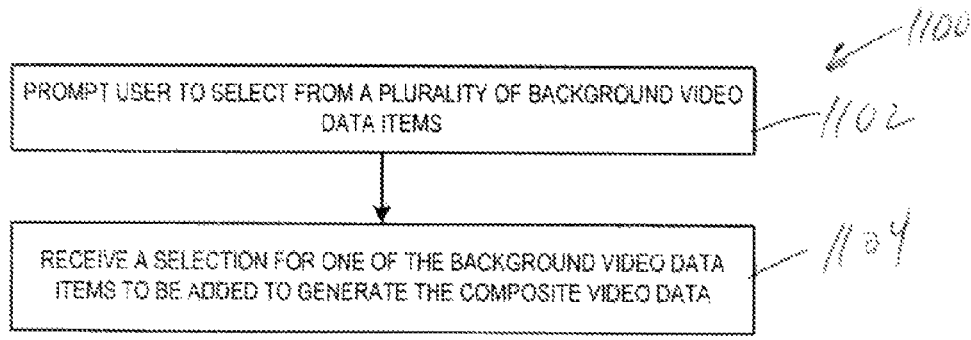
FIG. 11 is a flow diagram of an example process of selecting substitute background video data.

FIG. 11 is a flow diagram of an example process 1100 of selecting substitute background video data. Stage 1102 prompts the user to select from a plurality of background video data items. For example, the data items specifying an image, a video, a video stream, or a slide show as described in FIG. 5 may be presented to the user for selection. In another implementation, the video data items can be selected from a drop-down menu. In yet another implementation, the video data items may be selected from a user search.

Stage 1104 receives a selection from one of the background video data items to be added to generate the composite video data. For example, a mouse click may be interpreted as a selection of the background video data.

In one implementation, selection from the drop down menu causes the composite video to be generated in a preview pane made available to the participant. If the participant accepts the previewed composite video data, then the composite video data is transmitted to other videoconference participants.

Figure 12:
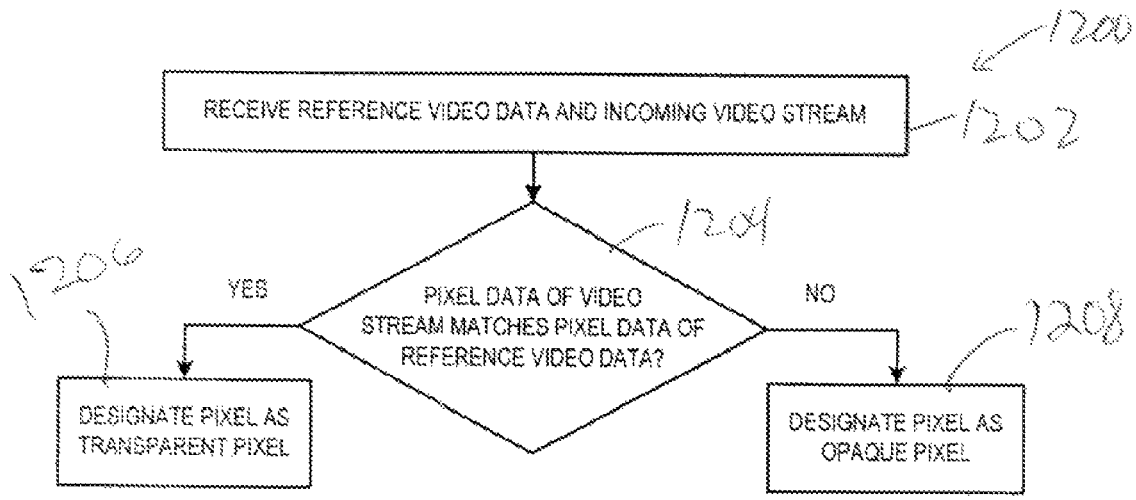
FIG. 12 is a flow diagram of an example process of generating subtracted video data.

FIG. 12 is a flow diagram of an example process 1200 of generating subtracted video data. Stage 1202 receives the reference video data and an incoming video stream. For example, an image of the background of the video environment may be stored and thereafter a video stream of the video environment may be received.

Stage 1204 determines if the pixel data of the video stream matches the pixel data of the reference video data. Pixels may be determined to match if their respective data values are within a threshold range.

If the pixel data is determined to match, stage 1206 designates the pixel as transparent pixel. For example, the pixel's transparency value (e.g., an alpha channel) can be set to a minimum value.

If the pixel data is not a match, stage 1208 designates the pixel as an opaque pixel. For example, the pixel's transparency value (e.g., an alpha channel) can be set to a maximum value.

In another implementation, matching pixels may be designated a default color, e.g., blue, and replaced with corresponding background pixels by a blue screen process.

Figure 13:
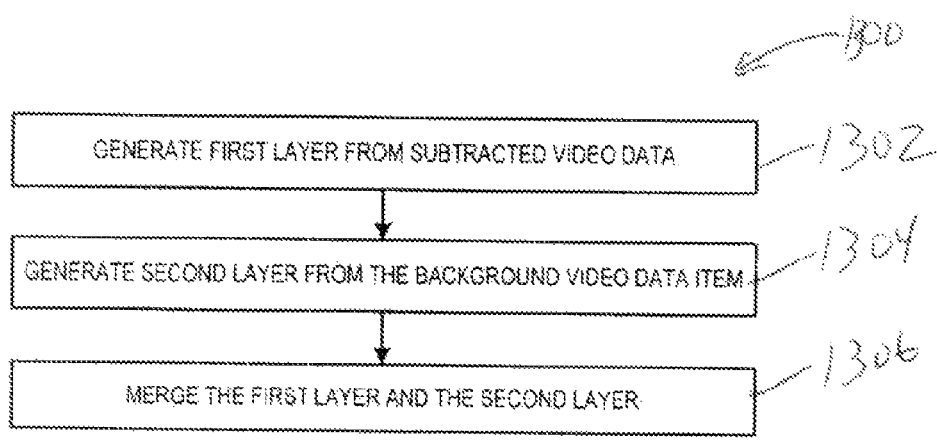
FIG. 13 is a flow diagram of an example process of generating composite video data.

FIG. 13 is a flow diagram of an example process 1300 of generating composite video data. Stage 1302 generates a first layer from the subtracted video data. In one implementation, the first layer comprises the background data. For example, the background data can include the box 114, the desk 116 and the wall 118 in the participant environment 110.

Stage 1304 generates a second layer from the background video data. In one implementation, the second layer comprises the substitute video data. For example, the substitute background data can include an image, a video, or a slideshow.

Stage 1306 merges the first layer and the second layer. In one implementation, the layers can be merged such that the second layer is seen through the transparent pixels of the first layer. In another implementation, the second layer may merge with the first layer by a blue screen process.

Figure 14:
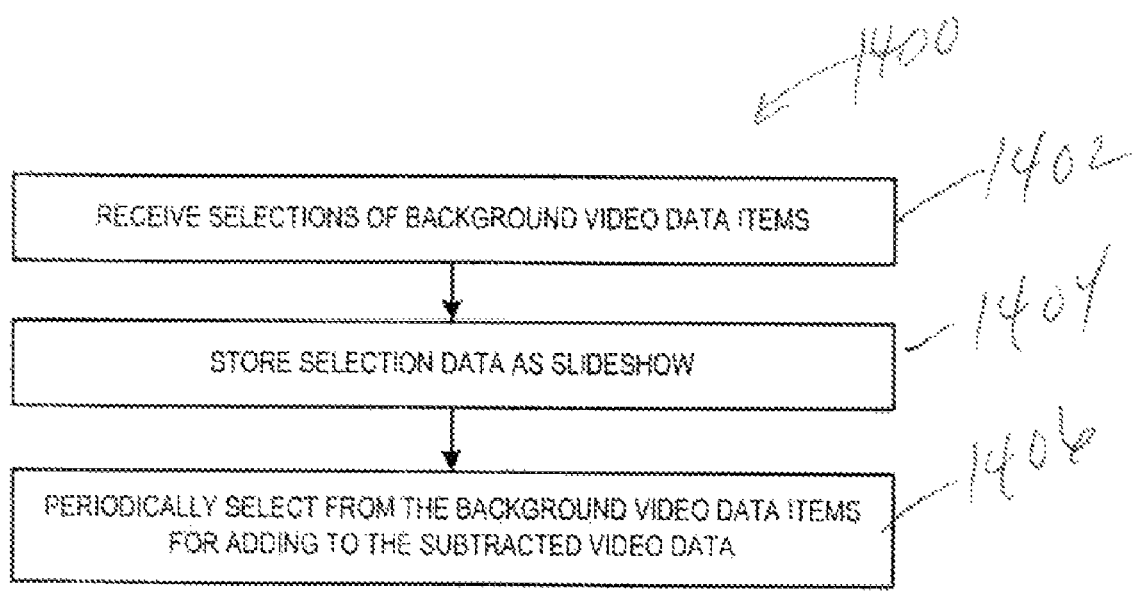
FIG. 14 is a flow diagram of an example process of generating slideshow composite video data.

FIG. 14 is a flow diagram of an example process 1400 of generating slideshow composite video data. Stage 1402 receives selections of one or more background data items. For example, the data items can include a set of images, a video feed, or some combination thereof.

Stage 1404 stores the selection data as a slideshow. For example, the slideshow is stored on the data store 106 and includes references, such as pointer or addresses, to the designated image files, video files, and other video data files and/or sources.

Stage 1406 periodically selects from the background video data items for adding to the subtracted video data. In one implementation, the data items can be selected at random, in a sorted order, or in a predetermined order by the video conference manager 126. For example, a participant may include movies and images from a vacation in a slideshow, and use the movies and images as replacement background images during a videoconference.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:

storing by a computing system background video data of a videoconference participant environment in a data store, the background video data defining, for each of a plurality of pixels, color data values of the pixel and an alpha channel value of the pixel;

receiving by the computing system additional video data of the videoconference participant environment, the additional video data defining, for each of a plurality of pixels, color data values of the pixel and an alpha channel value of the pixel;

determining by the computing system whether a pixel of the additional video data is a match to a corresponding pixel of the background video data, wherein a match indicates that both color data values of a pixel of the additional video data and color data values of a corresponding pixel of the background video data are within a threshold range;

if a pixel of the additional video data is determined to be a match to a corresponding pixel of the background video data, then setting an alpha channel value for the pixel to a first value that designates the pixel of the additional video data as a transparent pixel;

if a pixel of the video data is determined not to be a match to a corresponding pixel of the background video data, then setting an alpha channel value for the pixel to a second value that designates the pixel of the additional video data as an opaque pixel;

generating by the computing system a first layer from the additional video data having pixels designated as transparent and pixels designated as opaque based on the respective alpha channel values, each of the pixels including the color data of the additional video data;

generating by the computing system a second layer from a substitute background video data item, the second layer including data defining, for each of a plurality of pixels, color data of the pixel;

merging by the computing system the first layer and the second layer to generate composite video data, the composite video data include each of the first layer and the second layer, the second layer being subordinate to the first layer so that only the pixels of the second layer that correspond to transparent pixels of the first layer are shown from the second layer when the composite video data is presented for display; and transmitting by the computing system the composite video data to a videoconference for display to other video conference participants.

2. The method of claim 1, further comprising:

prompting a user to select from a plurality of substitute background video data items; and receiving a selection for one of the substitute background video data items; and wherein generating a second layer from a substitute background video data item comprises generating a second layer from the selected one of the substitute background video data items.

3. The method of claim 1, wherein:

generating by the computing system a second layer from substitute background video data item comprises generating second layers from substitute background video data items, wherein at least one of the second layers is generated from a first substitute background video data item that is different from another second background video data item that is used for generating an other second layer; and merging by the computing system the first layer and the second layers to generate respective composite video data comprises merging the first layer and the second layers to generate respective composite video data for video conference participants, the respective composite video data for each video conference participant including the first layer and one of the second layers, the second layer being subordinate to the first layer so that only the pixels of the second layer that correspond to transparent pixels of the first layer are shown from the second layer when the composite video data is presented for display; and transmitting by the computing system the composite video data to a videoconference for display to other video conference participants comprises transmitting to each videoconference participant the respective composite video data for display; and further comprising:

receiving, for each of the video conference participants, a selection of a respective substitute background video data item from the plurality of background video data items;

associating each respective substitute background video data item with each of the videoconference participants for which it was selected; and for each of the videoconference participants, generating the respective composite video data based on the respective substitute background video data item and the video data and transmitting the respective composite video data to the videoconference participant.

4. The method of claim 1, further comprising:
storing video data files;
storing image data files; and
prompting a user to select one of the stored video data files or one of the stored image data files as the substitute background video data item.

5. The method of claim 1, wherein:
storing background video data of a videoconference participant environment comprises:
prompting a videoconference participant to move out of the videoconference participant environment; and
storing image data of the videoconference participant environment without the participant present.

6. The method of claim 5, further comprising:
prompting the videoconference participant to indicate when the videoconference participant has moved out of the videoconference environment.

7. The method of claim 1, further comprising:
receiving selections of a plurality of substitute background video data items; and
periodically selecting one of the selected plurality of substitute background video data items for generation of the second layer.

8. The method of claim 1, further comprising:
receiving composite video data of another video conference participant environment;
providing for display to a video conference participant in the video conference participant environment the received composite video data of the another video conference participant environment in a first subsection of a display device; and
providing for display to the video conference participant the transmitted composite video data in a second subsection of a display device, the second subsection being subordinate to the first subsection.

9. The method of claim 1, wherein:
at least one of the substitute background video data items specify a slide show that includes a plurality of other video data items, and wherein the substitute background video data item that specifies the slide show causes each of the plurality of other video data items to be automatically selected periodically as the substitute background video data item for use in generating the second layer.

10. A system, comprising:
a video camera configured to generate video data;
a data store storing background data files;
a communication subsystem to receive and transmit video data; and
a video processing device configured to
 capture background video data of a videoconference environment and receive additional video data of the video conference environment, wherein the background video data and the additional video data define, for each of a plurality of pixels, color data values of the pixel and an alpha channel value of the pixel;
 determine whether a pixel of the additional video data is a match to a corresponding pixel of the background video data, wherein a match indicates that both color data values of a pixel of the additional video data and color data values of a corresponding pixel of the background video data are within a threshold range;
 set an alpha channel value of a pixel of the additional video data to a minimum value to designate the pixel as transparent if the pixel of the additional video data is determined to be a match to a corresponding pixel of the background video data;
 set an alpha channel value of a pixel of the additional video data to a maximum value to designate the pixel as opaque if the pixel of the additional video data is determined not to be a match to a corresponding pixel of the background video data;
 generate a first layer from the additional video data having pixels designated as transparent and pixels designated as opaque based on the respective alpha channel values, each of the pixels including the color data of the additional video data;
 generate a second layer from a background data file, the second layer including data defining, for each of a plurality of pixels, color data of the pixel; and
 merge the first layer and the second layer to generate composite video data including each of the first and second layers so that pixels in the second layer are shown through corresponding pixels in the first layer according to the alpha channel values of the corresponding pixels, and transmit the composite video data to a videoconference.

11. The system of claim 10, wherein:
the background data files comprise video data files and image data files.

12. The system of claim 10, wherein:
the background data files comprise slideshow data files from which different background data files are automatically selected periodically as the background data file for use in generating the second layer.

13. The system of claim 10, wherein:
the video processing device is configured to generate second layers of background data files, wherein at least one of the second layers is generated from a first substitute background video data file that is different from another second background video data file that is used for generating an other second layer, to merge the first layer and the second layers to generate respective composite video data for each video conference participant including the first one of the second layers so that pixels in the second layer are shown through corresponding pixels in the first layer according to the alpha channel values of the corresponding pixels, and transmit the respective composite video data to respective videoconference participants in a videoconference; and
the video processing device is further configured to prompt a user to select a respective background data file and for each respective videoconference participant and associate the respective background data files with the respective videoconference participants and for each respective videoconference participant generate associated composite video data based on the respectively associated background data file.

14. The system of claim 10, wherein:
the processing device is further configured to prompt a user to select one or more background data files to define slideshow data and automatically and periodically select the one or more background data files from the slideshow data for substitution to generate generation of the composite video data.

15. The system of claim 10, wherein:
the background video data comprises streamed video data received over the communication subsystem.

16. A system, comprising:
means for storing background video data of a videoconference participant environment, the background video data defining, for each of a plurality of pixels, color data values of the pixel and an alpha channel value of the pixel;

means for receiving additional video data of the videoconference participant environment, the additional video data defining, for each of a plurality of pixels, color data values of the pixel and an alpha channel value of the pixel;

means for determining if a pixel of the additional video data is a match to a corresponding pixel of the background video data, wherein a match indicates that both a color data value of a pixel of the video data and a color data value of a corresponding pixel of the background video data are within a threshold rang; setting an alpha channel value for the pixel to a first value that designates the pixel of the additional video data as a transparent pixel if a pixel of the additional video data is determined to be a match to a corresponding pixel of the background video data, and setting an alpha channel value for the pixel to a second value that designates the pixel of the additional video data as an opaque pixel if a pixel of the additional video data is determined not to be a match to a corresponding pixel of the background video data;

means for generating a first layer from the additional video data having pixels designated as transparent and pixels designated as opaque based on the respective alpha channel values, each of the pixels including the color data of the additional video data, generating a second layer from substitute background video data, the second layer including data defining, for each of a plurality of pixels, color data of the pixel, and merging the first layer and the second layer to generate composite video data, the second layer being subordinate to the first layer so that only the pixels of the second layer that correspond to transparent pixels of the first layer are shown when the composite video data is presented for display; and means for transmitting the composite video data to a videoconference.

* * * * *